United States Patent [19]

Cormary et al.

[11] Patent Number: 4,546,917
[45] Date of Patent: Oct. 15, 1985

[54] TEMPERATURE AND HYGROMETRY CONTROL AND REGULATION INTERFACE

[75] Inventors: Yves Cormary, Ville St. Jacques; Christian Nicolas, Samoreau, both of France

[73] Assignee: Service National Electricite de France, France

[21] Appl. No.: 646,902

[22] Filed: Aug. 31, 1984

[30] Foreign Application Priority Data

Sep. 6, 1983 [FR] France ............................ 83 14188

[51] Int. Cl.⁴ .......................................... G05D 22/00
[52] U.S. Cl. ..................................... 236/44 C; 236/49; 236/91 C
[58] Field of Search .................. 236/44 R, 44 C, 44 F, 236/44 A, 49, 91 R, 91 D, 91 C; 165/21, 16, 26; 62/176.1, 176.5, 176.6

[56] References Cited

U.S. PATENT DOCUMENTS 3,580,501  5/1971  Streed ........................... 236/91 C X
4,182,484  1/1980  Stanke et al. ..................... 236/49 X

FOREIGN PATENT DOCUMENTS 1455776   9/1966  France .
2034290  12/1970  France .
2215589   8/1974  France .
2394762   1/1979  France .
2092778   8/1982  United Kingdom ............... 236/49
2100476  12/1982  United Kingdom ............... 236/49

Primary Examiner—Harry Tanner
Attorney, Agent, or Firm—McCormick, Paulding & Huber

[57] ABSTRACT

The interface according to the invention is intended to receive temperature SRT and hygrometry SRH regulation signals from the temperature and hygrometry regulators. It sends heating SCC and ventilation SCV control signals to heating and ventilation devices of variable output. The interface has two positions, summer and winter. In summer, it regulates ventilation as a function of temperature (or possibly of hygrometry). In winter, it regulates the heating as a function of temperature; ventilation is then regulated by the application of a variable restriction on the extraction flow.

3 Claims, 2 Drawing Figures

FIG_1

TEMPERATURE AND HYGROMETRY CONTROL AND REGULATION INTERFACE

BACKGROUND OF THE INVENTION

The present invention relates to a temperature and hygrometry control and regulation interface.

Numerous temperature regulation devices are known, which are sensitive to the difference existing between a temperature control signal and a temperature measurement signal from a transducer, these regulators producing a temperature regulation signal whose amplitude varies as a function of this difference. In particular, there are regulatorss of the PI (proportional integrator) type. The temperature regulation signal thus obtained generally serves to control heating means of variable output, particularly electric heating means.

Similarly, numerous hygrometry regulation devices are known, which are sensitive to the difference existing between a hygrometry control signal and a hygrometry measurement signal from a transducer, these regulators producing a hygrometry regulation signal as a function of this difference. These regulators are generally of the P (proportional) type and serve to control means controlling ventilation, for example ventilators in which the extraction flow is variable.

The simultaneous regulation of these two parameters, temperature and hygrometry, very frequently poses numerous problems when the regulators are independent of each other.

This is particularly the case in animal rearing premises where a strong production of latent heat during winter necessitates the maintenance of a sufficient level of ventilation for preserving a hygrometry acceptable for the animals; these premises being additionally heated in winter, one notes frequently a poor coordination between the two actions, heating and ventilation, which often exhibits itself by a strong ventilation flow at the same time as heating at high power.

One of the objects of the invention is to remedy these inconveniences, whilst improving the regulation of temperature and hygrometry of the premises, avoiding at the same time waste of energy. This joint management of temperature and hygrometry is equally applicable to human living quarters and to tertiary industries where the problems of regulating heat and ventilation are of the same type, but with different control points.

SUMMARY OF THE INVENTION

For this, the invention proposes an interface cooperating with at its inputs the temperature regulator and the humidity regulator and with at its outputs the heating control means and the ventilation control means.

The interface is firstly able to pass from a summer position to a winter position according to whether the temperature measurement signal is respectively above or below a predetermined value of changeover of control. A preliminary discrimination is thus brought about between the conditions of summer regulation (heating out of service) and the conditions of winter regulation (heating in service), the passing from one position to the other being effected about a "dead point" for example situated in the region of 20° C.

In the summer position, on the one hand, the interface delivers a summer regulation signal to the temperature regulation means, and delivers to the ventilation control means a ventilation control signal inversely proportional to the temperature regulation signal delivered by the temperature regulation means.

One thus ensures a regulation of temperature by action on the ventilation.

In the winter position, on the other hand, the interface permits delivery to the temperature regulation means a winter temperature control means, (different to the summer temperature control means), and delivery to the heating control means a heating control signal directly proportional to the temperature regulation signal delivered by the temperature regulation means.

One thus maintains, by action on the heating, the temperature at its control value defined by the temperature regulator, the control signal being different from that determined for the summer period.

Advantageously, in the winter position, the interface in addition delivers to the ventilation control means a ventilation control signal proportional to a hygrometry regulation signal, this ventilation control signal being limited to an upper value inversely proportional to the amplitude of the temperature regulation signal delivered by the temperature regulation means.

One thus limits the ventilation as a function of the intensity of heating, this limitation being that much more strict as the heating is more intense.

Preferably, there is provided in addition means for limiting the ventilation control signal to a lower predetermined value, this limitation being effective in the summer position as well as in the winter position. This permits avoidance of the regulation causing discomfort to the occupants of the premises, since it is possible to maintain a minimum extraction flow.

Other characteristics and advantages of the invention will appear on reading of the following detailed description of an embodiment, with reference to the accompanying drawings, in which:

DETAILED DESCRIPTION

Figure 1:
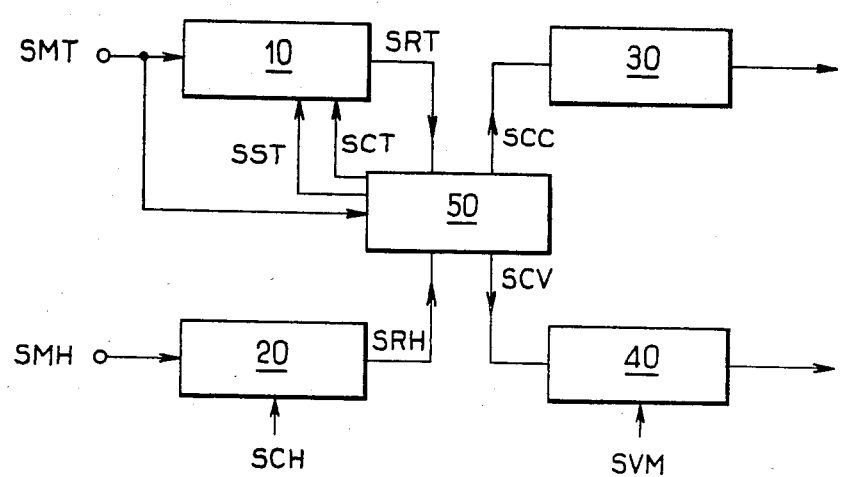
FIG. 1 is a schematic view of an interface according to the invention and of the circuits with which it cooperates.

FIG. 1 shows the temperature regulator 10 which, as a function of the difference existing between a temperature measurement signal SMT and a temperature control signal SCT, delivers a temperature regulation signal SRT as a function of the difference noted. The regulator is for example of the PI (proportional integrator) type, the signal SST controlling the mode of action of the regulator, (directly proportional or inversely proportional).

The hygrometry regulator 20 determines the difference between a hygrometry measurement signal SMH and a hygrometry control signal SCH and delivers a hygrometry regulation signal SRH as a function of this difference. This regulator is, for example, of the P (proportional) type, the regulation signal being directly proportional to the difference measured.

The reference 30 designates heating control means, for example a current controller for controlling an electric heater; these means permitting control of the (variable) heating power as a function of the heating control signal SCC.

The ventilation control means 40 are for example control means of a variable flow ventilation system. The flow varies as a function of a ventilation control signal SCV, if necessary maintaining a minimum level of ventilation SVM.

The interface 50 in accordance with the invention is connected to the different members described above, it receives from the temperature regulator the signals SMT and SRT and delivers to it the signals SST and SCT; similarly it receives the signal SRH from the hygrometry regulator. In addition, it delivers to the control means for heating and ventilation the signals SCC and SCV, respectively.

Figure 2:
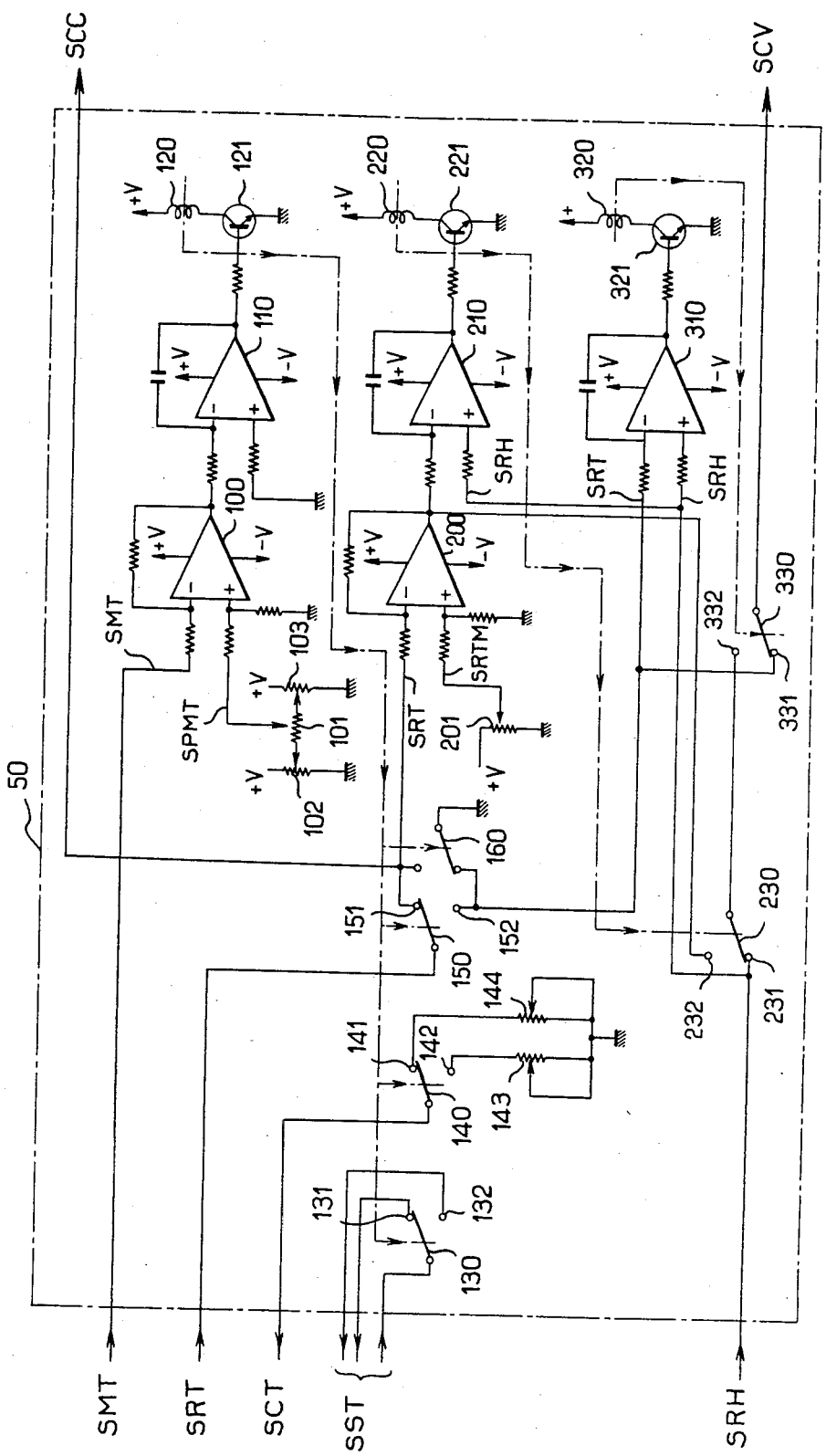
FIG. 2 is an electronic circuit diagram of an embodiment of this interface.

FIG. 2 shows in a detailed manner the make-up of this interface 50.

The temperature measurement signal SMT is first amplified and compared, in the stages 100 and 110, to a temperature dead point signal SPMT corresponding to the temperature at which the changeover of control is effected, that is to say the passing from the summer position to the winter position. This signal SPMT is for example determined by the setting of three potentiometers 101, 102, 103 in a manner to permit a fine regulation of the dead point between 15° and 25°, for example.

At the output of stage 110, there is thus arranged a positive voltage in summer (when the temperature measured is above the dead point) and a negative voltage in winter (in the opposite case).

In summer, the transistor 121 is conducting, exciting the relay 120 so as to close the contacts 130, 140, 150 and 160.

(Here and in the following, the relay contacts are all shown in FIG. 2 in the rest position, that is to say for a non-excited relay).

The contact 130 determines the mode of action of the temperature regulator (position 131: direct mode in winter; position 132: inverse mode in winter). The contact 140 defines the control (position 141: winter temperature control defined by the potentiometer 143; position 142: summer temperature control defined by the potentiometer 144). The contact 150 determines the action to regulate as a function of the temperature (position 151: heating regulation as a function of the temperature, in winter; position 152: ventilation regulation as a function of temperature, in summer). Finally, the contact 160 earths the contact 151 or 152 not commuted by the contact 150. In particular, this contact 160 puts the heating out of service in the summer position.

The second series of stages of the interface 50 permits limiting of the ventilation as a function of heating, when the latter is in service. This limitation is a greater limitation, which intervenes in the case where the hygrometry regulation signal SRH (applied to one of the inputs of the comparator stage 210), is above an authorised limit value, that is to say a value corresponding to a rate of maximum heating regulation, diminished in value corresponding to the effective rate of regulation of temperature.

This variable limit value is obtained by means of a subtraction stage 200, which receives at its inverse input the temperature regulation signal SRT, and at its direct input a signal SRTM corresponding to a maximum rate of regulation; this signal SRTM is an invariable signal, fixed by the potentiometer 201. It should be noted, in the summer position, that the contact 160 earths the input to the stage 200 which previously received the temperature regulation signal; thus earthing is made in order that the limitation of ventilation will never occur in summer.

When the limitation occurs, a positive voltage appears at the output of the stage 210, which renders the transistor 221 conductive and excites the relay 220; which provokes closing of the contact 230. In this manner, in the absence of limitation, the hygrometry regulation signal SRH is transmitted directly to the ventilation control means (position 231 of contact 230). On the contrary, when limitation occurs, the signal which is transmitted to the ventilation control means is the signal obtained at the output of the stage 200, that is to say a signal corresponding to the variable limit value (position 232 of contact 230).

The upper limitation value of the ventilation control signal, obtained in this example from application by subtraction of the actual temperature regulation signal SRT from a signal SRTM corresponding to a maximum temperature regulation signal, can of course be obtained by any function, linear or not, connecting this heating signal to the upper limit of the ventilation signal.

A third series of circuits permits obtaining a strong ventilation as a function of the interior temperature. In summer, in effect, the temperature regulator does not act on the heating, but on the ventilation. For then maintaining a comfortable hygrometry, one will compare (always in the summer position) the temperature and hygrometry regulation signals SRT and SRH thanks to the comparator stage 310. If the signal SRH is higher than the signal SRT, a positive voltage appears at the output of comparator 310, the transistor 321 is rendered conductive and the relay 320 is excited. This provokes closing of the contact 330 in the position 332: it is then the hygrometry regulation signal SRH which is transmitted for controlling the ventilation means. In the contrary case, the relay is not excited and it is the temperature regulation signal SRT which controls the ventilation (position 331 of contact 330).

It should be noted, in winter, the contact 152 is earthed by the contact 160. In this manner, a positive voltage will permanently appear at the output of comparator 310, in order that the relay 320 will always be excited, and that the regulation will never be obtained as a function of temperature, but only as a function of humidity (with possibly the application of a limitation).

Alternatively, there may also be provided between the interface 50 described above and the ventilation control circuit 40 an intercalary circuit (not shown) permitting maintenance of the ventilation control signal applied to the input of circuit 40 to a minimum value for avoiding all inconvenience to the occupants of the premises, for example to a minimum ventilation fixed at 30%, this value being possibly adjusted as required.

I claim:

1. In a temperature and hygrometry control and regulation interface cooperating with:
   a. temperature regulation means producing a temperature regulation signal SRT as a function of the difference existing between a temperature control signal SCT and a temperature measurement signal SMT,
   b. hygrometry regulation means producing a hygrometry regulation signal SRH as a function of the difference existing between a hygrometry control signal SCH and a hygrometry measurement signal SMH,
   c. heating control means functioning in response to a heating control signal SCC, and
   d. ventilation control means functioning in response to a ventilation control signal SCV, the improvement comprising:
- means whereby said control interface is adapted to pass from a summer position, when said temperature measurement signal SMT is above a predetermined changeover of control value, and a winter position, when said temperature measurement signal is below said predetermined change of control value;
- means whereby said control interface permits in said summer position:
  a. delivering to said temperature regulation means a summer temperature control signal SCT, and
  b. delivering to said ventilation control means a ventilation control signal SCV inversely proportional to said temperature regulation signal SRT delivered by means of said temperature regulation means; and
- means whereby said control interface permits, in said winter position:
  a. delivering to said temperature regulation means a winter temperature control signal SCT, different from said summer temperature control signal,
  b. delivering to said heating control means a heating control signal SCC directly proportional to said temperature regulation SRT signal delivered by the temperature regulation means and
  c. delivering to said ventilation control means a ventilation control signal proportional to said hygrometry regulation signal SRH, said ventilation control signal being limited to an upper value inversely proportional to the amplitude of said temperature regulation signal SRT produced by said temperature regulation means.

2. An interface according to claim 1, further comprising means whereby said upper limitation value of said ventilation control signal is obtained by subtraction of the actual temperature regulation signal SRT from a signal SRTM corresponding to a maximum temperature regulation signal, and by comparison of the result to a hygrometry regulation signal SRH, said ventilation control signal being determined from the one of these two compared signals having the lower value.

3. An interface according to claim 1, further comprising means for limiting aid ventilation control signal to a predetermined low value SVM, this limitation being achieved not only in said summer position but also in said winter position.

* * * * *